United States Patent [19]
Elsley

[11] Patent Number: 5,949,676
[45] Date of Patent: Sep. 7, 1999

[54] METHOD AND SYSTEM FOR DIAGNOSING THE BEHAVIOR OF A MACHINE CONTROLLED BY A DISCRETE EVENT CONTROL SYSTEM

[75] Inventor: Richard K. Elsley, Thousand Oaks, Calif.

[73] Assignee: Allen-Bradley Company LLC, Milwaukee, Wis.

[21] Appl. No.: 08/902,737

[22] Filed: Jul. 30, 1997

[51] Int. Cl.⁶ .................................................. G05B 9/02
[52] U.S. Cl. ................................. 364/184; 364/185
[58] Field of Search ........................... 364/184, 185, 364/578; 702/181, 185; 371/25.1; 395/183.01

[56] References Cited

U.S. PATENT DOCUMENTS

4,747,048  5/1988  Meuller ................................. 364/184
5,214,577  5/1993  Sztipanovits et al. ................ 364/184
5,293,323  3/1994  Doskocil et al. ..................... 702/185

*Primary Examiner*—William Grant
*Assistant Examiner*—Carolyn T. Baumgardner
*Attorney, Agent, or Firm*—Keith M. Baxter; John M. Miller; John J. Horn

[57] ABSTRACT

A method and system for diagnosing the behavior of a machine which performs a discrete event process. A diagnostic engine observes occurrences of discrete events to detect timing patterns. A statistical analysis is performed on repetitions of the timing patterns, thus providing the basis for defining diagnostic rules. The rules are updated in real time and are subject to a rule competition procedure in which only the most precise and efficient rules are selected. Further occurrences of discrete events are evaluated relative to the diagnostic rules to identify and predict malfunctions of the machine.

38 Claims, 3 Drawing Sheets

METHOD AND SYSTEM FOR DIAGNOSING THE BEHAVIOR OF A MACHINE CONTROLLED BY A DISCRETE EVENT CONTROL SYSTEM

FIELD OF THE INVENTION

The present invention relates generally to discrete event control systems that control the operation of an automated machine, and more particularly to a system and method for developing diagnostic rules by observing the behavior of the machine and for using the diagnostic rules to detect malfunctions in the behavior of the machine.

BACKGROUND OF THE INVENTION

Discrete event control systems, such as an automated industrial control system, generally control a machine having a large number of components (e.g., sensors and actuators), which may malfunction due to transient errors and other hard or soft failures. Because of the immense number of possible failure points in the machine, attempts have been made to provide control systems that automatically diagnose the malfunction and pinpoint the failure point, thus reducing costly down-time of the industrial plant.

Known systems have approached the diagnostic problem with varying success. For example, the diagnostic engines of prior art systems often are based on state-machine models that can detect only certain hard failures. Thus, transient errors and the erroneous occurrence of events are not diagnosed and predictions of malfunctions are not feasible. Further, such diagnostic engines often must be explicitly programmed. Or, if the engine is capable of autonomously learning the behavior of a machine, the learning session often is based on data gathered while the machine is operating in one machine state, in a fixed environmental condition, and at the beginning of the life of the machine. Accordingly, real-time changes in the behavior of the machine, that may be due to environmental conditions or the natural wear and aging process, are often erroneously diagnosed as malfunctions. To be able to take the various operating conditions into account, the diagnostic engine must either undergo a lengthy reprogramming process or be subjected to a new learning session.

Prior art systems also generally are incapable of discerning the optimum state-machine model to use for developing the rules to diagnose the behavior of the machine. For example, the state-machine model will include a number of known sequential and temporal patterns which indicate the proper occurrences of the various discrete events associated with the manufacturing process. The diagnostic engine, however, may indiscriminately develop diagnostic rules based on these patterns. Thus, a particular rule may be based on a pattern corresponding to a known causal relationship between events, a pattern including a sequence of a large number of discrete events, or a pattern including a long time interval between discrete events. Each of these scenarios presents disadvantages and inefficiencies. In particular, restraining diagnostic rules to known causal relationships prevents the engine from selecting non-intuitive timing patterns that may produce simpler, more efficient rules. Moreover, a long sequential pattern necessitates the use of a larger amount of memory to store the occurrences of the multiple discrete events in the pattern and consumes more computing power, while a rule based on a long temporal pattern may result in a tardy diagnosis of a machine malfunction. Further, known diagnostic engines typically are not capable of determining the minimum number of patterns necessary to adequately diagnose the machine's behavior and predict malfunctions or of judging which patterns provide the most reliable indicators of the machine's health.

Accordingly, it would be desirable to develop a versatile diagnostic engine for discrete event control systems capable of discriminately developing diagnostic rules for diagnosing the behavior of an automated machine. The diagnostic engine would not be restricted by known causal relationships and, thus, could autonomously select and learn the optimum discrete event patterns for reliably diagnosing and predicting the behavior of the machine. Moreover, the diagnostic engine would be capable of automatically adapting to changed operating conditions of the machine, such as environmental variations, modifications to the machine, wear and aging of the machine, and different machine states.

SUMMARY OF THE INVENTION

The present invention comprises a system and method for developing diagnostic rules which are based on discrete event timing patterns that occur during operation of the machine. The system and method further evaluate the occurrences of the discrete events relative to the diagnostic rules to identify malfunctions in the behavior of the machine.

According to a first embodiment of the invention, a system and method for developing diagnostic rules for diagnosing the behavior of a machine is provided. The system and method include a plurality of control elements which cooperate to perform at least one discrete event process and which are configured to transition between at least two different states. Each state transition represents a discrete event in the process, and the occurrence of each discrete event is communicated to a main controller. The main controller is configured to detect a timing pattern in the occurrence of the discrete events which includes a trigger event, a result event, and a time interval between the trigger and result events. A diagnostic rule is then defined based on a statistical analysis of repetitions of the timing pattern. The diagnostic rule is then updated in real time based on a detected change in the timing pattern.

According to one aspect of the invention, the statistical analysis includes calculating a mean time interval between the trigger and result events and a standard deviation from the mean time interval. A diagnostic rule is defined based on the statistical analysis if the timing statistics satisfy certain defined criteria. For example, a rule may be defined if the magnitude of the ratio of the standard deviation to the mean time interval is less than a predetermined maximum magnitude. Alternatively, the diagnostic rule may be defined if the duration of the mean time interval is less than a predetermined maximum duration.

In another aspect of the invention, a diagnostic rule may be replaced due to a detected change in the timing pattern. For example, the main processor may detect a change in which the result event follows a different trigger event. This change in effect creates a new timing pattern. If the standard deviation associated with the new timing pattern is smaller than the standard deviation associated with the original timing pattern, the main processor will replace the original diagnostic rule with the new rule.

In accordance with yet another aspect of the invention, the machine has a first machine state for performing a first discrete event process and a second machine state for performing a second discrete event process. The main processor looks for a timing pattern common to at least both machine states and then defines a diagnostic rule based on the common timing pattern.

A further aspect of the invention includes a plurality of control modules coupled to a communication link to communicate the occurrences of the discrete events to the main processor. Each of the control modules is configured to detect state transitions of at least one of the control elements.

Another embodiment of the invention provides a system and method for diagnosing the behavior of a machine configured to perform a discrete event process. A plurality of control elements are configured to transition between at least two states. The occurrence of each state transition, which represents a discrete event in the process, is communicated to a main processor via a communications link. The main processor is configured to detect in real time a timing pattern in the occurrences of the discrete events, including a trigger event, a result event, and a time interval between the trigger and result events. A diagnostic rule is then defined based on a real-time statistical analysis of repetitions of the timing patterns. Occurrences of the discrete events are evaluated in real time relative to the diagnostic rule to identify whether a malfunction in the machine's behavior is present.

According to one aspect of the invention, a malfunction is identified if the result event does not occur after the trigger event within at least one standard deviation about the mean time interval. Alternatively, a malfunction is identified if an unexpected event occurs.

In accordance with another aspect of the invention, the diagnostic rule is updated in real time by including further repetitions of the timing pattern in the real time statistical analysis.

The invention further features a display that provides visible indicia, such as alphanumeric characters or a graphical presentation, that is representative of the malfunction.

Other advantages of the invention will become apparent from the detailed description given hereinafter. It should be understood, however, that the detailed description and specific embodiments are given by way of illustration only. Based on the following description, various changes and modifications within the spirit and scope of the invention will readily become apparent to those skilled in the art.

BRIEF DESCRIPTION OF THE DRAWINGS

The preferred exemplary embodiment of the invention will hereinafter be described in conjunction with the appended FIGURES, in which like reference numerals denote like elements, and.

DETAILED DESCRIPTION OF A PREFERRED EMBODIMENT

Automated control systems, such as are used in manufacturing plants, are often used to control an industrial machine comprising a large number of sensors and actuators which cooperate to perform a dynamic process, such as a manufacturing or assembly process. As the automated system runs, the sensors and actuators (i.e., "control elements") transition between states in repetitive sequential, and oftentimes temporal, patterns. For example, in an automated system which controls a machine, such as an automated assembly line, a proximity sensor will transition between states, indicating the presence of an object (e.g., an empty bottle). Some time interval after this event, an actuator will transition between states, indicating, for instance, the initiation of an operation on the object (e.g., filling the bottle with a liquid). Next, a photodetector sensor will transition between states, indicating that the bottle is full. If the assembly line is functioning properly, the timing relationships between these discrete events will be quite regular. If, however, any component of the system malfunctions, the regular timing patterns will be disrupted. Accordingly, these regular timing patterns can provide reliable behavioral indicators useful for diagnosing the machine's health.

However, these timing patterns may vary over the life of the machine because of environmental factors, modifications of the machine, normal wear on the components, and other variables. Moreover, the timing patterns may vary depending on the state of the machine. For example, in the above-described scenario, the same assembly line may be used to fill both large bottles and small bottles. As another example, the conveyor speed may change from one state to the next. Accordingly, a variation in the duration of the time interval between initiating and completing the injection of the bottle with fluid will necessarily exist but will not be indicative of a malfunction. The present invention provides a system and method for diagnosing the machine's behavior which are capable of adapting to such operational changes. In accordance with this system and method, diagnostic rules are discriminately defined, selected, and updated based on the observation of the machine's discrete event timing patterns.

Figure 1:
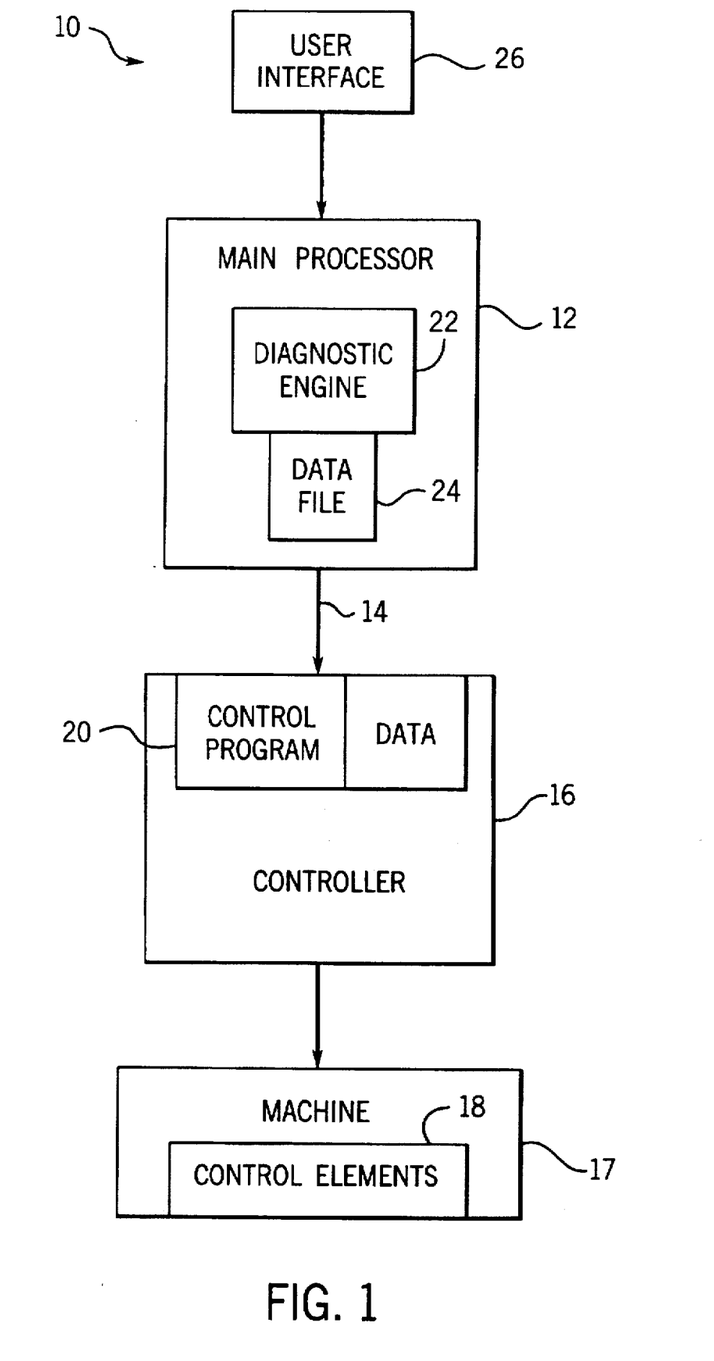
FIG. 1 is a block diagram schematic representing a system including a diagnostic engine for diagnosing the behavior of a machine controlled by a discrete event control system in accordance with a preferred embodiment of the present invention.

Referring now to FIG. 1, a block diagram representation of a system 10 according to a preferred embodiment of the invention is illustrated. System 10 includes a main processor 12, a communication link 14, a controller 16, and a machine 17 which comprises a plurality of control elements 18. Control elements 18 include a plurality of sensors and actuators which cooperate to perform a dynamic, discrete event manufacturing process. A control program, which is stored in a memory 20 of controller 16 and executed by the controller's processor (not shown), governs the manufacturing process during which control elements 18 transition between states in a deterministic sequence as a result of the flow of materials or parts.

Each state change of a control element 18 is a discrete event which is detected by controller 16 and stored as data in its memory 20. For example, in the preferred embodiment, controller 16 is a programmable logic controller, such as a PLC-5 available from Allen-Bradley Company of Milwaukee, Wis., which is programmed to periodically scan the control elements 18 to determine their respective states. Controller 16 then compares the state of each element to the value of its state on the previous scan. A state change represents the occurrence of a discrete event, and a list of discrete events is accumulated in memory 20. Controller 16 reports the discrete events to main processor 12 via communication link 14, which comprises, for example, copper conductors, an RF link or other types of links suitable for conveying digital data.

In the preferred embodiment, main processor 12 is incorporated in a general purpose personal computer and includes, for example, a microprocessor (e.g., an ×86 processor, a PENTIUM™, or an equivalent) (not shown), and a memory (not shown) for storing a diagnostic engine 22 and a data file 24. Alternatively, main processor 12 may be incorporated within controller 16. System 10 further includes a user interface 26 which may include a display screen (e.g., the personal computer's CRT or LCD display, or a peripheral display device) providing for the output of text and graphics from main processor 12, a keyboard allowing for the entry of alphanumeric characters to processor 12, and a mouse aiding in manipulation of graphical icons which appear on the display screen.

The display screen of user interface 26 preferably includes a variety of control windows, data display windows, and dialogue boxes. For example, the control windows and dialogue boxes may include icons and text which aid in configuring system 10. The data display windows may be used to display the occurrences of discrete events in a graphical format. Further, existing and active rules may be displayed in either in a graphical or tabular format. Malfunctions may also be displayed graphically or, alternatively, symbolically or as a text message in a dialogue box.

Referring still to FIG. 1 and as is well known in the art, processor 12 may further include various driver and interface circuitry (not shown) to manage the flow of data on communication link 14. For example, the discrete event data reported from controller 16 is conveyed to data file 24 through the driver and interface circuitry. The discrete event data in file 24 may then be passed to diagnostic engine 22. Engine 22 preferably is a software program which can operate in either a learning mode or a diagnosing mode. During learning, engine 22 is configured to analyze the discrete event data in order to define diagnostic rules, and, during diagnosing, engine 22 evaluates the behavior of machine 17 relative to the diagnostic rules. Engine 22 may define rules and evaluate behavior in real-time or, alternatively, the discrete event data may be stored in the memory of processor 12, or written to a data storage disk (not shown), for off-line learning of diagnostic rules or evaluation of the machine's behavior by diagnostic engine 22.

1. Learning Diagnostic Rules

During the learning mode, diagnostic engine 22 observes the occurrences of the discrete events to find repetitive sequences of events which occur in a consistent timing pattern. Each timing pattern preferably consists of two discrete events (i.e., a trigger event and a result event) and a time interval between the two events, although diagnostic engine 22 is not prohibited from selecting timing patterns which include more than two discrete events. Engine 22 then defines diagnostic rules based on a statistical analysis of the repetitive timing patterns, compares existing rules to newly defined rules to determine the optimum rules for evaluating the machine's behavior, and updates the existing rules by either updating the statistical analysis based on further repetitions of the timing pattern or replacing the existing rules with better diagnostic rules.

Figure 2:
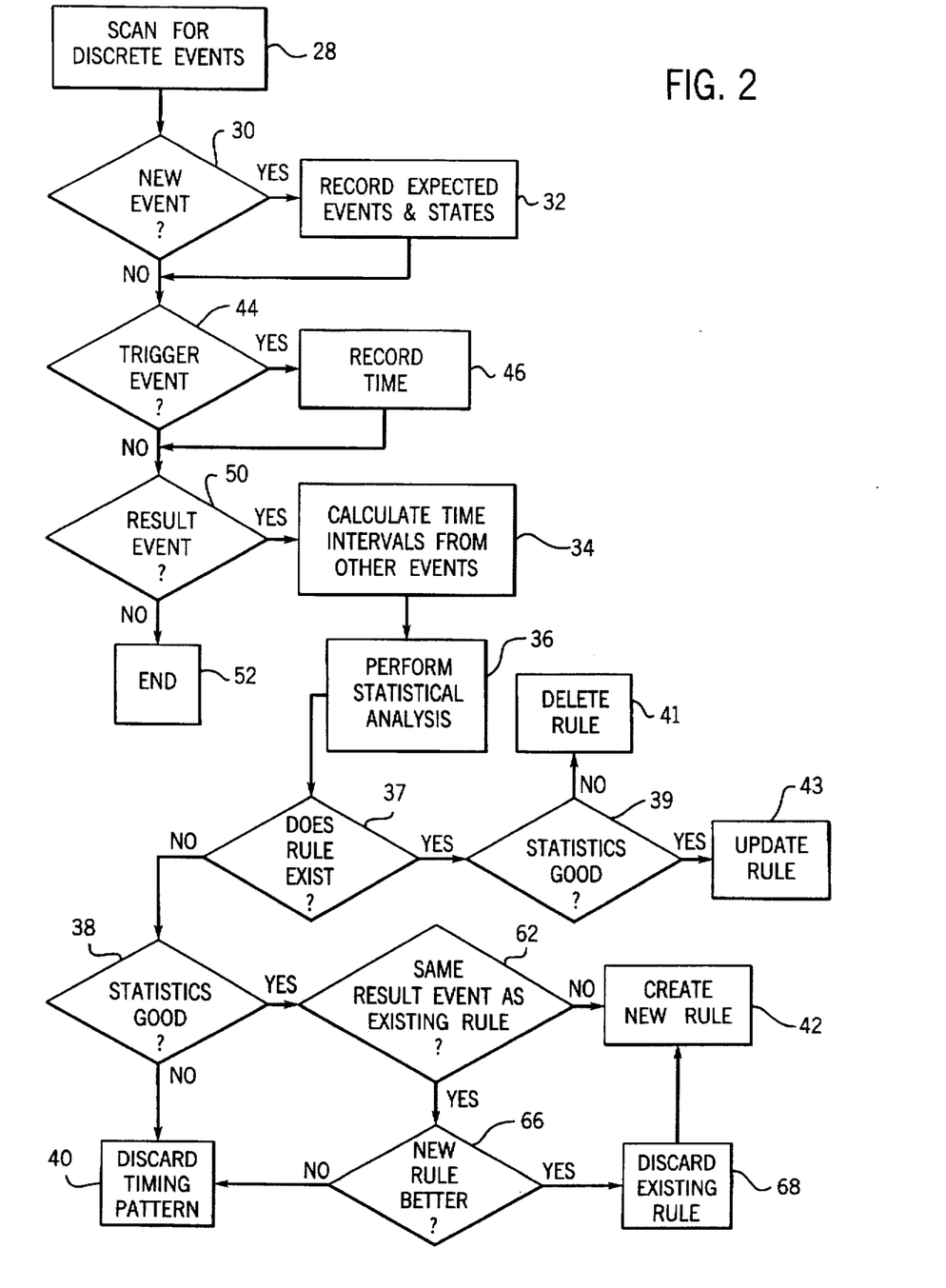
FIG. 2 is a flow chart representing exemplary steps for defining, updating and selecting the optimum diagnostic rules for the system of FIG. 1 while the diagnostic engine is in the learning mode.

The various steps involved in obtaining and analyzing the discrete event data for rule learning are illustrated in the flow chart of FIG. 2. In the preferred embodiment, as discussed above, the scan is performed by controller 16 (block 28). However, in alternative embodiments the scan may be performed by other elements of system 10, such as main processor 12. In any event, and regardless of whether reported in real-time or read from memory or disk during an off-line analysis, the occurrences of discrete events are communicated to diagnostic engine 22, which then determines whether the discrete event has been previously detected (block 30) and whether the discrete event is a trigger event for any existing rules (block 44), is a potential or established result event for any rules (block 50), or is an event which has been eliminated as a candidate for a potential rule (block 52). The first time a discrete event is detected, it is recorded as an expected event in a file stored in memory of main processor 12. The state of control elements which never experience a discrete event (i.e., do not transition between states) are also stored in this file. During diagnosis, engine 22 may reference this file to identify malfunctions if the occurrence of a discrete event or a state of a control element has been detected that was not previously logged as an expected event.

Returning to FIG. 2, if the detected discrete event is a trigger event of any existing rules, then the event's time of occurrence is recorded (block 46). Otherwise, if the discrete event can be a result event for any rules (block 50), then diagnostic engine 22 determines the timing interval between the discrete event and all possible trigger events (block 34). A statistical analysis is then performed (block 36) which involves incrementally calculating a mean time interval between trigger and result events and a standard deviation about the mean time interval as further repetitions of trigger/result timing patterns are detected.

Next, if a particular trigger/result timing pattern does not correspond to an existing rule (block 37), then the timing statistics of the pattern are evaluated to determine whether the timing pattern is adequate to define a new diagnostic rule (block 38). In the preferred embodiment, a minimum of three repetitions of the timing pattern must be observed before the timing statistics can be evaluated to provide the basis for a diagnostic rule, although clearly a greater number of repetitions would be desirable. Further, if a machine is capable of operating somewhat differently at some times than others (e.g., a conveyor system in which palates are randomly merged from two conveyor lines), the timing statistics will not be sufficient until diagnostic engine 22 has experienced the different operational situations.

Various criteria, or combinations of the criteria, may be used to evaluate the timing statistics. For example, a timing pattern having a mean time interval or a standard deviation that is longer than the cycle time of the manufacturing process will not provide the basis for a useful diagnostic tool. Further, examining the magnitude of the standard deviation and/or the ratio of the standard deviation to the mean time interval may reveal that a resulting diagnostic rule will not be sufficiently precise. If the evaluation criteria are not met (e.g., the mean time interval, the standard deviation, and/or their ratio are too large), then the timing pattern will be discarded as a candidate for a diagnostic rule (block 40), and the timing pattern's discrete events may even be tagged such that they are eliminated as potential candidates for any rules. If, however, the criteria are met and the pattern's result event is not already a result event in an existing rule (block 62), then a diagnostic rule will be defined using the timing statistics of that timing pattern (block 42), thus dictating the timing relationship between the trigger and result events.

As will be explained in more detail below, the diagnostic rules preferably are symmetric rules. That is, the trigger and result events each must occur within an error band about the mean time interval of the other. The error band, which may either be fixed or selectable by a user, is a multiple of the standard deviation and, preferably, is five times the standard deviation.

Once the diagnostic rules are defined, they are either retained or enter a rule competition, as will be explained in detail below. If the rules are retained, they may be updated continuously, including replacement, during the learning process based on the incremental accumulation of timing statistics from further repetitions of the timing patterns. As illustrated in FIG. 2, if a timing pattern occurs that corresponds to an existing diagnostic rule (block 37), the accumulated timing statistics for the pattern are evaluated using the criteria discussed above (block 39). If the accumulated statistics for the rule no longer meet the evaluation criteria, then the rule may be discarded (block 41). If, however, the accumulated statistics are good, then the statistics of the rule are updated to reflect the further repetitions of the associated timing pattern (block 43).

The evaluation criteria applied in blocks 38 and 39 may also provide a basis for rating the merit of timing patterns and existing diagnostic rules. For example, rather than discarding an existing rule if the timing statistics do not meet the criteria, the rule may merely be deactivated. In such a case, the rule remains in existence and is a candidate for activation if its future accumulated timing statistics meet the evaluation criteria. Alternatively, if an existing rule's timing statistics fail to satisfy the evaluation criteria by a wide margin, then the rule may not only be discarded, but also tagged as a rule that should never be considered again. Likewise, if a timing pattern's statistics fail to satisfy the criteria by a wide margin, then future occurrences of the pattern, or even one or all of the discrete events associated with the pattern, may be ignored.

A detected break or inconsistency in a timing pattern also warrants removal of the timing pattern or the corresponding rule from further consideration. For example, a timing pattern or rule may be discarded either if its result event occurs without the prior occurrence of its corresponding trigger event (not shown); or if the rule's trigger event occurs a second time without the intervening occurrence of its corresponding result event (not shown); or if a machine state ends after a trigger event has occurred but before its corresponding result event occurs (not shown). Any of these exemplary breaks in a timing pattern indicates that a rule based on that timing pattern will not provide a consistently reliable indicator of the machine's behavior.

a. Rule Competition

To minimize memory requirements and optimize the computing efficiency of main processor 12, it is preferable to select only a minimum number of timing patterns. The selected timing patterns should also provide the most precise indicators of the machine's behavior. To achieve these goals, a rule competition procedure may be initiated in which an existing rule can be updated by replacing it with a better rule. The rule competition further allows diagnostic engine 22 to select diagnostic rules that may not necessarily have been intuitive from a knowledge of the machine's architecture.

In the preferred embodiment and as illustrated in FIG. 2, a timing pattern enters into competition with an existing rule if they both include the same result event (block 62). The statistics of the timing pattern are compared to the statistics of the existing rule to determine whether the existing rule indeed provides the most accurate and efficient diagnosis of the behavior of machine 17 (block 66). If the statistics of the timing pattern are better than the statistics of the existing rule, then the existing rule is updated, in effect, by discarding the existing rule (block 68) and creating a new rule based on the better timing pattern (block 42). In the preferred embodiment, the statistics which include the smallest standard deviation are deemed to provide the basis for the better rule. If, however, the magnitudes of the two standard deviations are close in value, then the mean time intervals are also compared. Although the above-described rule competition is presently preferred, diagnostic engine 22 may also be set to retain more than one rule for a given result event and may specify other criteria, or combination of criteria, for the competition.

b. State-Dependent Learning

The selection of the best diagnostic rules may also be affected by whether machine 17 is capable of running in more than one machine state. For example, machine 17 may be used to manufacture several different types of parts (e.g., a standard truck cab and an extended truck cab), and, thus, the details of the machine's operation will be somewhat different in each state. For instance, some control elements 18 may not be activated in one of the states, or, if active, the timing patterns may be different. Maintaining separate rule bases for each different state would be prohibitive in terms of the computational and memory requirements for main processor 12. On the other hand, defining a single set of rules that will apply to all machine states will be difficult in most situations. Therefore, it is preferable that diagnostic engine 22 observe the operation of machine 17 in all states, and then define a maximum number of diagnostic rules based on timing patterns that are common to all states and a minimum number of rules based on timing patterns peculiar to a particular state. Further, each resulting rule is preferably tagged with code that indicates the state or states to which the rule applies.

Before defining a common diagnostic rule, the timing statistics of the common timing pattern are subjected to the same evaluation process as described above. If the statistics of the common timing pattern do not satisfy the evaluation criteria (e.g., the mean time interval, the standard deviation or their ratio are too large), however, then diagnostic engine 22 will attempt to discover a version of the common timing pattern that will produce an acceptable diagnostic rule. For example, if the time interval between the trigger and result events varies between states as a result of a change in conveyor speed and a measurement of conveyor speed is available, then a diagnostic rule can be defined having a mean time interval that is a function of the measured speed. As another example, if the manufacturing process can diverge into one of multiple courses of action and then resume a single course, forward or backward-looking diagnostic rules can be defined that diagnose the final and initial events of the individual courses of actions respectively, as will be explained below.

c. Symmetric and Forward and Backward-Looking Rules

In general, the diagnostic rules can be either symmetric rules, forward-looking rules, or backward-looking rules. In a symmetric rule, an event B always follows an event A and vice versa. The following timing pattern satisfies the requirements of a symmetric rule:

B—A—B

In a forward-looking rule, event A is always followed by event B, but not vice versa. Both of the following examples of timing patterns satisfy the test for a forward-looking rule:

B—A—B

B—B

In a backward-looking rule, event B is always preceded by event A, but not vice versa. Thus:

B—A—B

B—A—A—B

Preferably, the diagnostic rules are symmetric rules, and thus also satisfy the tests for forward and backward-looking rules. However, if a symmetric rule does not satisfy the evaluation criteria, a forward or backward-looking rule may be defined instead, and, in the preferred embodiment, the rule includes a code indicating whether the rule is a symmetric, forward-looking, or backward-looking rule. Backward and forward-looking rules have uses other than that discussed above. For example, if a control element experiences bounce, the element's change of state can still be the trigger event of a backward-looking rule.

d. Grouping of Control Elements

For machines having an extremely large number of control elements 18, the definition of diagnostic rules could involve extensive computation and large amounts of memory. Thus, in the preferred embodiment of the invention, diagnostic engine 22 can employ alternative strategies that prevent the amount of computation time and the amount of memory from becoming excessive. For example, control elements 18 may be divided into independent groups which have little or no interaction with other groups. Rules are then defined on a group basis, and the rules for each group include only those discrete events which correspond to elements 18 within that group.

In practice, however, groups of elements 18 usually do interact with one another, but only on a limited basis. Accordingly, some of the elements of one group can be selected to be visible to another group and are thus included in the rules for the latter group. Selecting the visible elements may be easily accomplished based on a knowledge of the architecture of the control system. Further, grouping of control elements 18 for diagnostic purposes is particularly suited for a control system which includes multiple distributed controllers 16. In such a distributed control system, each controller 16 is associated with a group of control elements 18, and, thus, the system architecture is easily discernible. In alternative embodiments, other strategies may be employed, such as performing the rule definition process in stages in which only certain groups of control elements 18 participate at a given time.

2. Diagnosis

Once diagnostic rules are learned, diagnostic engine 22 may be set to the diagnostic mode in which incoming discrete events are evaluated relative to the diagnostic rules to identify existing or potential malfunctions in the behavior of machine 17. The evaluation of the discrete events may be performed in several alternative manners. For example, referring to FIG. 3, the timing relationship between the trigger and result events may be evaluated relative to the timing statistics learned during the learning process (blocks 80, 82, 88, and 90). Accordingly, if, for instance, the result event does not occur within five learned standard deviations of the learned mean time interval and the corresponding rule is either a symmetric or forward-looking rule, then system 10 will identify that a malfunction in machine 17 has occurred (block 86).

Alternatively, and preferably, the timing statistics are incrementally updated in real time based on observing further repetitions of the timing patterns associated with the diagnostic rule. For example, in the preferred embodiment illustrated in FIG. 3, if a scanned discrete event (block 72) is the trigger event for an active rule (block 74), a rule timer is started (block 76). If the result event for the triggered rule occurs (block 78) within five standard deviations of the mean time interval (block 80), then the timer is stopped (block 82) and the timing statistics are updated (blocks 88 and 84). If, however, a result event occurs and its corresponding rule has not been triggered (block 78), or if the result event does not occur within the allotted time interval (block 80), the system 10 identifies that a malfunction in machine 17 has occurred (block 86).

Figure 3:
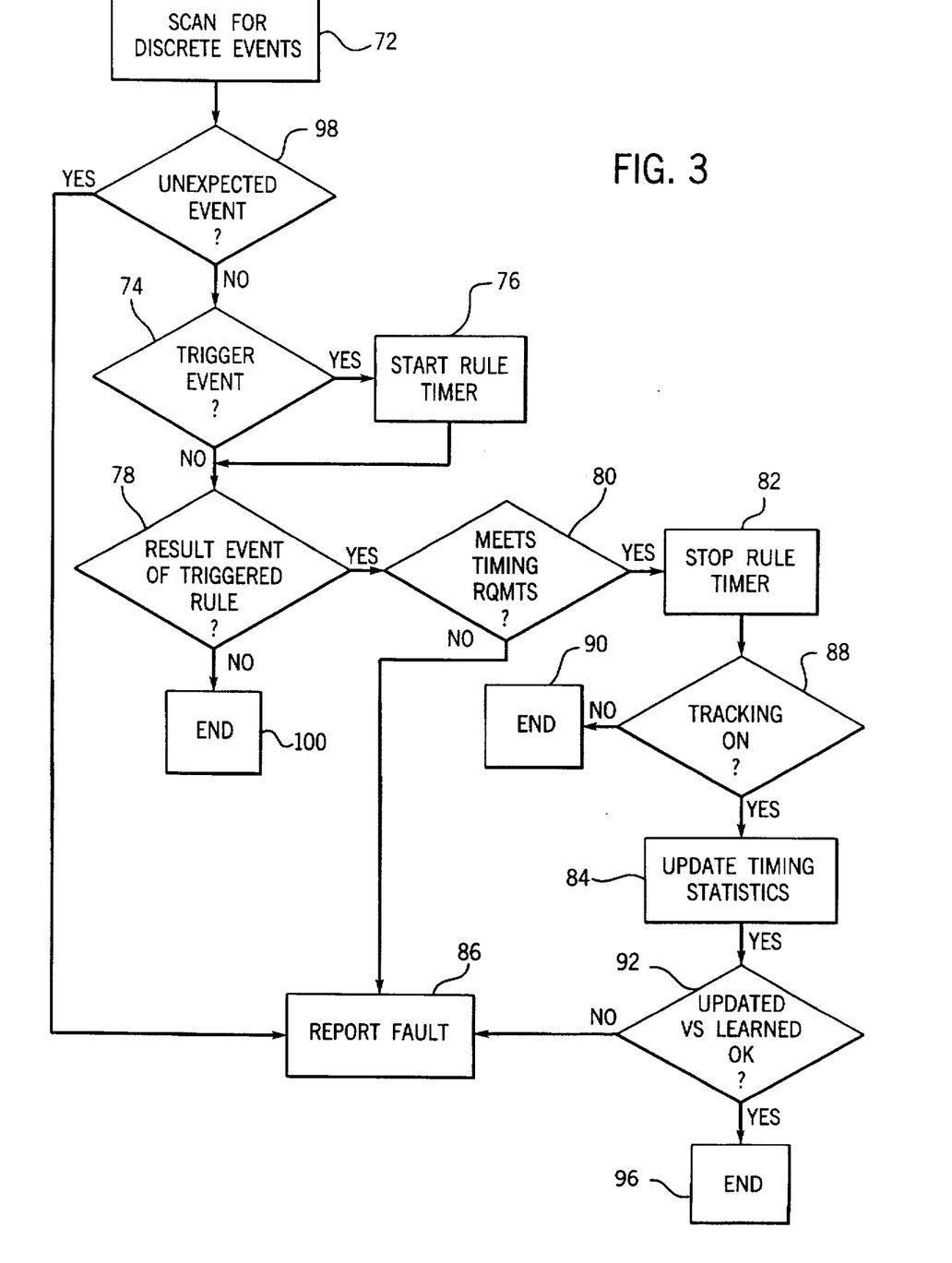
FIG. 3 is a flow chart representing exemplary steps for identifying a malfunction in the behavior of the machine and updating the timing statistics associated with the diagnostic rules while the diagnostic engine of FIG. 1 is in the diagnostic mode.

In the preferred embodiment, both the learned timing statistics and the updated timing statistics are retained as separate files in the memory of main processor 12. The learned timing statistics thus provide a baseline reference for evaluating the performance of machine 17, while the updated timing statistics, which may be regularly replaced (e.g., on a daily, weekly or monthly basis), provide a mechanism by which the diagnostic rules can autonomously adapt in real time to changed operating conditions. For example, in the preferred embodiment, occurrences of discrete events may be evaluated by determining whether a result event occurs after its trigger event within a multiple of the learned standard deviation of the updated mean time interval. Using the updated mean time interval in conjunction with the learned standard deviation ensures that system 10 does not interpret changes in the timing pattern caused by manufacturing variations, such as normal machine wear and aging, temperature or other environmental conditions, as machine malfunctions. In alternative applications, however, both the updated mean time interval and the updated standard deviation may be used or only the updated standard deviation may be used. As yet another alternative, the diagnostic rules may be updated by replacing the learned timing statistics with the updated timing statistics.

Diagnostic engine 22 preferably also tracks (block 88) the updated timing statistics against the learned timing statistics, although the tracking feature is optional (block 90). Accordingly, engine 22 can diagnose a large change or drift in the updated timing statistics relative to the learned statistics (block 92) as indicative of an existing or potential malfunction in the behavior of machine 17 (blocks 86, 96).

The criteria that engine 22 employs to identify malfunctions may vary depending on the type of diagnostic rule used. For example, symmetric and forward-looking rules can be used to identify a malfunction (a) when a result event occurs either too soon or too late after its trigger event, (b) when a trigger event reoccurs before its corresponding result event has ever occurred, or (c) when a machine state ends before a result event occurs for a rule that has been triggered. Symmetric and backward-looking rules can be used to identify a malfunction, for example, (a) when a trigger event occurs either too early or too late relative to its corresponding result event, (b) when a result event reoccurs without a corresponding reoccurrence of its trigger event, or (c) when a result event occurs during a particular machine state and its trigger event did not precede it while in that machine state. It should be understood that these types of malfunctions are offered by way of example only, and that one skilled in the art would recognize that other types of malfunctions may be readily diagnosed.

Upon detection of a malfunction, main processor 12 generates an error signal indicative of the malfunction and communicates it to user interface 26. User interface 26 preferably includes a display driver (not shown) which, in response to the error signal, communicates a display signal to the display screen which then provides visible indicia indicating that a malfunction has occurred. For example, alphanumeric characters may appear on the display screen stating that a particular discrete event has occurred at an improper time. Or, a user may provide a custom message to be displayed for a fault of a particular rule or rules. Alternatively, the display may provide a graphical representation of the faulted rule or rules which highlights the problem area, such as with a flashing or colored marker. In other embodiments, other types of displays or audio components for effectively communicating the occurrence of the malfunction, either alone or in combination, may be readily envisioned by those skilled in the art.

In addition to identifying timing errors, the present invention can identify malfunctions that are characterized by the occurrence of an unexpected event. For example, after having observed machine 17 in all operating states and conditions, diagnostic engine 22 may detect the occurrence of a discrete event that it has never seen before or that had never occurred while the machine was operating in the present machine state (i.e., the discrete event has not been recorded in the expected events file stored in memory of main processor 12) (block 98). This unexpected event may be indicative of a malfunction or of an unusual condition, such as the opening of a safety gate. In any event, diagnostic engine 22 will generate an error signal (block 86) that is translated into an error message that is displayed on the display screen of user interface 26.

Unexpected events also include detection of a control element which is in the wrong state. For example, in some machine states, a control element may never experience a discrete event and, thus, is always in one particular state. Accordingly, if engine 22 detects that the control element is in or has transitioned to the other state (block 98), the unexpected event will be diagnosed as a malfunction (block 86).

It should also be understood that some discrete events may not be either a trigger or a result event for any diagnostic rule (blocks 74 and 78). In such a case, and provided the discrete event is not an unexpected event (block 98), diagnostic engine 22 will simply ignore its occurrence (block 100).

Although the foregoing description has been provided for the presently preferred embodiment of the invention, the invention is not intended to be limited to any particular arrangement, but is defined by the appended claims. For example, either the rule definition process or the diagnostic process, or both, may be performed off-line using discrete event data that has been stored in memory. Or, the diagnostic rules initially may be defined by a user and then may be updated or replaced based on real-time observation of discrete events. Alternatively, a user may manually modify the diagnostic rules after the rules have been defined based on real-time observation. Further, the diagnostic rules may be based on other variations or types of statistical analyses of the repetitions of the timing patterns. These and other alternative configurations of the invention, that may occur to those skilled in the art, are intended to form a part of the invention to the extent such alternatives fall within the scope of the appended claims.

What is claimed is:

1. A system for developing diagnostic rules for diagnosing the behavior of a machine performing a process with discrete events, the system comprising:
a main processor; and
a plurality of control elements in communication with the main processor and the machine, the control elements detecting the discrete events and communicating them to the main processor,
wherein the main processor is configured (1) to detect a timing pattern in the occurrences of the discrete events, the timing pattern including a trigger event, a result event, and a time interval between the trigger and result events, (2) to define a diagnostic rule based on a statistical analysis of repetitions of the timing pattern, and (3) to update the diagnostic rule in real time based on a detected change in the timing pattern.

2. The system as recited in claim 1, wherein the statistical analysis includes calculating a mean time interval between the trigger and result events and a standard deviation from the mean time interval.

3. The system as recited in claim 2, wherein the main processor calculates a ratio of the standard deviation to the mean time interval and defines the diagnostic rule if the magnitude of the ratio is substantially equal to or less than a predetermined maximum magnitude.

4. The system as recited in claim 2, wherein the main processor defines the diagnostic rule if the duration of the mean time interval is substantially equal to or less than a predetermined maximum duration.

5. The system as recited in claim 2, wherein the main processor defines the diagnostic rule if the magnitude of the standard deviation is substantially equal to or less than a predetermined maximum deviation.

6. The system as recited in claim 1, wherein the detected change in the timing pattern is a duration change in the time interval between the trigger and result events.

7. The system as recited in claim 1, wherein the detected change in the timing pattern is the occurrence of the result event a second time interval after a second trigger event, and the main processor (1) defines a second diagnostic rule based on a statistical analysis of repetitions of a second timing pattern including the second trigger event, the result event and the second time interval, and (2) updates the diagnostic rule by replacing the diagnostic rule with the second diagnostic rule.

8. The system as recited in claim 7, wherein the statistical analysis of the repetitions of the timing pattern includes calculating a mean time interval between the trigger event and the result event and a standard deviation from the mean time interval, and the statistical analysis of the repetitions of the second timing pattern includes calculating a second mean time interval between the second trigger event and the result event and a second standard deviation from the second mean time interval.

9. The system as recited in claim 8, wherein the main processor updates the diagnostic rule by replacing the diagnostic rule with the second diagnostic rule if the second standard deviation is smaller than the standard deviation.

10. The system as recited in claim 8, wherein the main processor determines a first ratio of the standard deviation to the mean time interval and a second ratio of the second standard deviation to the second mean time interval, and the main processor updates the diagnostic rule by replacing the diagnostic rule with the second diagnostic rule if the second ratio is smaller than the first ratio.

11. The system as recited in claim 1, wherein the machine has a first and second machine state during which discrete events occur, and wherein the timing pattern is a common timing pattern occurring during at least both the first and second machine states, and the diagnostic rule is based on a statistical analysis of repetitions of the common timing pattern.

12. The system as recited in claim 1, wherein the diagnostic rules are symmetric diagnostic rules.

13. The system as recited in claim 1, further comprising a communication link and a plurality of control modules coupled to the communication link to communicate the occurrences of the discrete events to the main processor, wherein each control module is configured to detect the transitions between the states of at least one of the control elements.

14. The system as recited in claim 1, wherein the main processor is further configured to evaluate the detected change in the timing pattern relative to the diagnostic rule to identify a malfunction in the behavior of the machine.

15. The system as recited in claim 1 wherein the main processor is configured further (4) to evaluate in real time the occurrences of the discrete events relative to the diagnostic rule to identify a malfunction in the behavior of the machine.

16. The system as recited in claim 15, wherein the real time statistical analysis includes calculating a mean time interval between the trigger and result events and a standard deviation from the mean time interval.

17. The system as recited in claim 16, wherein the main processor identifies the malfunction when the result event does not occur after the trigger event within the mean time interval plus or minus at least one standard deviation.

18. The system as recited in claim 16, wherein the real time statistical analysis further includes calculating an updated mean time interval for each timing pattern based on further repetitions of the timing pattern.

19. The system as recited in claim 18, wherein the main processor identifies the malfunction when the result event does not occur after the trigger event within the updated mean time interval plus or minus at least one standard deviation.

20. The system as recited in claim 15, wherein the main processor identifies the malfunction when an unexpected event occurs.

21. The system as recited in claim 15, wherein the system further comprises a display in communication with the main processor to provide visible indicia representative of the malfunction.

22. The system as recited in claim 15, wherein the main processor is further configured to update the diagnostic rule in real time based on a detected change in the timing pattern.

23. A method for developing diagnostic rules for diagnosing the behavior of a machine having a plurality of control elements which cooperate to perform a plurality of discrete events the method comprising the steps of:

monitoring occurrences of discrete events associated with the plurality of control elements;

detecting a timing pattern in the occurrences of the discrete events, the timing pattern including a trigger event, a result event and a time interval between the trigger and result events;

performing a statistical analysis of repetitions of the timing pattern;

defining a diagnostic rule based on the statistical analysis;

detecting in real time a change in the timing pattern; and updating in real time the diagnostic rule based on the detected change.

24. The method as recited in claim 23, wherein performing the statistical analysis includes calculating a mean time interval and a standard deviation from the mean time interval.

25. The method as recited in claim 24, further comprising:

calculating a ratio of the standard deviation to the mean time interval;

comparing the magnitude of the ratio to a predetermined maximum magnitude; and rejecting the diagnostic rule if the magnitude of the ratio exceeds the predetermined maximum magnitude.

26. The method as recited in claim 24, further comprising:

comparing the duration of the mean time interval to a predetermined maximum duration; and rejecting the diagnostic rule if the duration of the mean time interval exceeds the predetermined maximum duration.

27. The method as recited in claim 24, wherein the detected change in the timing pattern is a duration change in the time interval, and updating the diagnostic rule includes calculating an updated mean time interval based on the duration change.

28. The method as recited in claim 23, wherein the detected change in the timing pattern is the occurrence of the result event a second time interval after a second trigger event, thereby defining a second timing pattern, and updating the diagnostic rule includes:

performing a second statistical analysis of repetitions of the second timing pattern;

defining a second diagnostic rule based on the second statistical analysis; and replacing the diagnostic rule with the second diagnostic rule.

29. The method as recited in claim 28, wherein performing the statistical analysis includes calculating a mean time interval and a standard deviation from the mean time interval, performing the second statistical analysis includes calculating a second mean time interval and a second standard deviation from the second mean time interval, and replacing the diagnostic rule includes comparing the standard deviation to the second standard deviation and replacing the diagnostic rule with the second diagnostic rule if the second standard deviation is smaller than the standard deviation.

30. The method as recited in claim 23, wherein the machine has a first machine state for performing a first discrete event process and a second machine state for performing a second discrete event process, the method further comprising:

selecting a common timing pattern occurring during at least both the first and second machine states;

performing a statistical analysis of repetitions of the common timing pattern; and defining a common diagnostic rule based on the statistical analysis.

31. The method as recited in claim 23, further comprising evaluating the detected change in the timing pattern relative to the diagnostic rule and identifying a malfunction in the behavior of the machine based on the evaluation.

32. The method as recited in claim 23 further including the step of identifying in real time a malfunction in the behavior of the machine based on evaluating the occurrences of the discrete events relative to the diagnostic rule.

33. The method as recited in claim 32, wherein performing the real time statistical analysis includes calculating a mean time interval and a standard deviation from the mean time interval.

34. The method as recited in claim 33, wherein identifying the malfunction includes evaluating whether the result event occurs after the trigger event within the mean time interval plus or minus at least one standard deviation.

35. The method as recited in claim 33, wherein performing the real time statistical analysis further includes calculating an updated mean time interval for each timing pattern based on further repetitions of the timing pattern.

36. The method as recited in claim 32, wherein identifying the malfunction includes evaluating whether an unexpected event has occurred.

37. The method as recited in claim 32, further comprising displaying visible indicia representative of the malfunction.

38. The method as recited in claim 32, further comprising updating the diagnostic rule in real time based on a detected change in the timing pattern.

* * * * *